US009846686B2

United States Patent
Scoda

(10) Patent No.: US 9,846,686 B2
(45) Date of Patent: *Dec. 19, 2017

(54) METHODS FOR EXTENDING A DOCUMENT TRANSFORMATION SERVER TO PROCESS MULTIPLE DOCUMENTS FROM MULTIPLE SITES AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/039,630

(22) Filed: Sep. 27, 2013

(65) Prior Publication Data

US 2014/0033022 A1    Jan. 30, 2014

Related U.S. Application Data

(63) Continuation of application No. 13/939,838, filed on Jul. 11, 2013, which is a continuation of application
(Continued)

(51) Int. Cl.
*G06F 17/22* (2006.01)
*G06F 17/30* (2006.01)

(52) U.S. Cl.
CPC ........ *G06F 17/2264* (2013.01); *G06F 17/227* (2013.01); *G06F 17/2247* (2013.01); *G06F 17/30905* (2013.01)

(58) Field of Classification Search
CPC .......... G06F 17/30905; G06F 17/2247; G06F 17/2264; G06F 17/227
(Continued)

(56) References Cited

U.S. PATENT DOCUMENTS 5,864,852 A * 1/1999 Luotonen .......... G06F 17/30902
707/999.009
6,549,952 B1    4/2003 Plassmann et al.
(Continued)

FOREIGN PATENT DOCUMENTS

KR    1020040038459 A    5/2004
KR    1020080097579 A    11/2008
(Continued)

OTHER PUBLICATIONS

International Search Report for International Patent Application No. PCT/US2011/048060 (dated Mar. 26, 2012).
(Continued)

*Primary Examiner* — Maikhanh Nguyen
(74) *Attorney, Agent, or Firm* — LeClairRyan, a Professional Corporation

(57) ABSTRACT

A method, computer readable medium and device that extends a document transformation server to process multiple documents from multiple websites includes obtaining with a document transformation server a document to process based on at least a URL of the document to process in an HTTP request URL. An XML source representing the document to process is generated with the document transformation server. One or more XML processors associated with at least a portion of the HTTP request URL from a plurality of stored associations are identified with the document transformation server. The XML source is transformed by the document transformation server with each of the identified one identified XML processors. The generated document is provided in an HTTP response to the HTTP request URL by the document transformation server.

12 Claims, 6 Drawing Sheets

Related U.S. Application Data

No. 12/807,766, filed on Sep. 14, 2010, now Pat. No. 8,516,362.

(58) Field of Classification Search
USPC ........ 715/200–202, 204–209, 231, 236, 752, 715/760
See application file for complete search history.

(56) References Cited

U.S. PATENT DOCUMENTS

| | | | | |
|---|---|---|---|---|
| 6,589,291 B1* | 7/2003 | Boag et al. | | 715/235 |
| 6,640,240 B1* | 10/2003 | Hoffman | G06F 17/30899 | 707/E17.119 |
| 6,785,707 B2 | 8/2004 | Teeple | | |
| 7,076,521 B2* | 7/2006 | Davison | | 709/203 |
| 7,134,073 B1* | 11/2006 | Fiedorowicz et al. | | 715/235 |
| 7,171,691 B2* | 1/2007 | Baber et al. | | 726/24 |
| 7,275,208 B2* | 9/2007 | Uramoto | G06F 17/272 | 707/999.1 |
| 7,590,644 B2* | 9/2009 | Matsakis | | G06F 8/41 |
| 7,636,565 B2* | 12/2009 | Owen et al. | | 709/203 |
| 7,707,492 B2* | 4/2010 | Zaharkin | G06F 17/2247 | 715/234 |
| 7,774,831 B2* | 8/2010 | Kuznetsov | G06F 9/546 | 713/153 |
| 8,352,570 B2* | 1/2013 | Saxena | G06F 17/30902 | 709/216 |
| 8,516,362 B2 | 8/2013 | Scoda | | |
| 8,578,266 B2* | 11/2013 | Davison | | 715/239 |
| 2002/0032706 A1 | 3/2002 | Perla et al. | | |
| 2002/0035579 A1* | 3/2002 | Wang | G06F 17/30905 | 715/234 |
| 2002/0038349 A1 | 3/2002 | Perla et al. | | |
| 2002/0073119 A1* | 6/2002 | Richard | G06F 17/30899 | 715/239 |
| 2002/0099785 A1 | 7/2002 | Teeple | | |
| 2002/0116534 A1 | 8/2002 | Teeple | | |
| 2002/0147747 A1* | 10/2002 | Zaharkin | G06F 17/2247 | 715/234 |
| 2002/0161802 A1 | 10/2002 | Gabrick et al. | | |
| 2003/0028577 A1* | 2/2003 | Dorland et al. | | 709/100 |
| 2003/0037069 A1 | 2/2003 | Davison | | |
| 2003/0065645 A1* | 4/2003 | Itoh et al. | | 707/1 |
| 2003/0101238 A1 | 5/2003 | Davison | | |
| 2004/0010753 A1* | 1/2004 | Salter et al. | | 715/513 |
| 2004/0133635 A1 | 7/2004 | Spriestersbach et al. | | |
| 2005/0014494 A1 | 1/2005 | Owen et al. | | |
| 2005/0262063 A1* | 11/2005 | Conboy | | G06F 17/30864 |
| 2006/0265689 A1* | 11/2006 | Kuznetsov | G06F 9/546 | 717/117 |
| 2007/0124446 A1* | 5/2007 | Coulthard et al. | | 709/223 |
| 2008/0183902 A1* | 7/2008 | Cooper et al. | | 709/250 |
| 2010/0161762 A1* | 6/2010 | Saxena | G06F 17/30902 | 709/219 |
| 2013/0305139 A1 | 11/2013 | Scoda | | |
| 2014/0033022 A1 | 1/2014 | Scoda | | |

FOREIGN PATENT DOCUMENTS

| | | |
|---|---|---|
| KR | 1020090104566 A | 10/2009 |
| WO | 2012036833 A2 | 3/2012 |

OTHER PUBLICATIONS

Office Action for corresponding Canadian Application No. 2,811,207, dated Mar. 22, 2017, pp. 1-4.

* cited by examiner

```
<map:pipeline xmlns:map="sample">
    <!-- welcome page -->
    <map:match pattern="">
        <!--+
            | Start generating SAX events inside the pipeline. In this case,
            | Since no "type" attribute is specified, the default generator
            | is used and this is a regular XML parser that reads the
            | given file from the URL included in the "src" attribute and
            | sends the events produced by the parser down the pipeline to
            | be processed by the next stage.
            +-->
        <map:generate src="welcome.xml"/>
        <!--+
            | This transformer gets the input SAX events and transforms them
            | using the default transformer (the XSLT transformer) thus
            | applying the XSLT stylesheet indicated in the "src" attribute
            | and sending the output down the pipeline to be processed by the
            | next stage.
            +-->
        <map:transform src="welcome.xslt">
            <map:parameter name="contextPath" value="{request:contextPath}"/>
        </map:transform>
        <!--+
            | The serializer concludes the SAX events journey into the pipeline
            | since it serializes the events it receives into a representation
            | depending on the serializer type. Here we choose the "XHMTL"
            | serializer, which will produce an XHTML representation of the
            | SAX stream.
            +-->
        <map:serialize type="xhtml"/>
    </map:match>
    <!-- internal pages -->
    <map:match pattern="static-site/**.xml">
        <map:generate src="xdocs/{1}.xml"/>
        <map:transform src="stylesheets/xdoc2html.xslt"/>
        <map:serialize type="html"/>
    </map:match>
</map:pipeline>
```

*FIG. 3*
*PRIOR ART*

```
<xsl-mapping>

<map level="1">
        <file>news.xsl</file>
        <path>/content/news</path>
    </map>

<map level="1">
        <file>content.xsl</file>
        <path>/content</path>
    </map>

<map level="2">
        <file>content2.xsl</file>
        <path>/content</path>
    </map>

<xsl-mapping>
```

FIG. 6

METHODS FOR EXTENDING A DOCUMENT TRANSFORMATION SERVER TO PROCESS MULTIPLE DOCUMENTS FROM MULTIPLE SITES AND DEVICES THEREOF

RELATED APPLICATIONS

This application is a continuation of U.S. patent application Ser. No. 13/939,838, filed Jul. 11, 2013, which is a continuation of U.S. patent application Ser. No. 12/807,766, filed Sep. 14, 2010, now U.S. Pat. No. 8,516,362, issued Aug. 20, 2013, each of which is hereby incorporated by reference in its entirety.

FIELD

This technology generally relates to methods and devices for transforming and rendering documents and, more particularly, to methods for extending a document transformation server to process multiple documents from multiple sites and devices thereof.

BACKGROUND

The introduction of eXtensible Markup Language (XML) and the EXtensibleStylesheet Language (XSL) specifications has provided an easy way to transform documents between various formats. This functionality has been included into Web development frameworks enabling them to automatically transform an XML file into a document with different format, such as HTML or XHTML, and integrate the original data with a graphic layout and user interface parts.

This transformation process is based on the following basic scheme. Each URL on a website is associated to a single XML file and to one or more XSL style sheets. The associated XML file and XSL style sheet(s) include the transformation rules used to customize the webpage into a desired format.

An example of a prior art method for transforming and rendering a single document is illustrated in FIG. 2. In step 100, a server receives an HTTP request. In step 102, the server extracts the parts from the PATH and QUERY fields in the HTTP request to identify and obtain the document to be processed.

In step 104, the server determines whether the extracted parts in the PATH and QUERY fields of the HTTP request match an XML source for the document to be processed. If in step 104 the server determines the extracted parts in the PATH and QUERY fields of the HTTP request do not have an association with an XML source, then the No branch is taken to step 106. In step 106, the server generates an error page document. In step 108 the server returns the generated error page document in an HTTP response to the HTTP request.

If in step 104 the server determines the extracted parts in the PATH and QUERY fields of the HTTP request do have an association with an XML source for the document to be processed, then the Yes branch is taken to step 110. In step 110, the server obtains the document to be processed from the XML source and generates an XML document.

In step 112, the server determines whether the extracted parts in the PATH and QUERY fields of the HTTP request match one of one or more stored XML processors. If in step 112 the server determines the extracted parts in the PATH and QUERY fields of the HTTP request do not match one of one or more stored XML processors, then the No branch is taken to step 114. In step 114, the server converts the XML document into a desired format. Next, in step 108 the returns the converted XML document in an HTTP response to the HTTP request.

If in step 112 the server determines the extracted parts in the PATH and QUERY fields of the HTTP request do match one or more stored of the XML processors, then the Yes branch is taken to step 116. In step 116, the server runs the one or more matching XML processors on the previously generated XML document. In step 114, the server converts the processed XML document into a desired format. Next, in step 108 the server returns the converted XML document in an HTTP response to the HTTP request.

Referring to FIG. 3, an exemplary prior art fragment of a sitemap.xmap document which is a configuration file of Apache Cocoon is illustrated. This fragment has two sets of prior art instructions to process documents.

The first set of instructions executed starts with XML element <map:match pattern=" "> and matches the document with an empty component in the PATH field that is the home page of a site (for example www.sample.com). The document is obtained by loading the XML file "welcome.xml" as the document or other file to be processed, then applying the XSL transformation described in welcome.xsl using XHTML format to return it to the browser because of the <map:serialize> instruction.

The second set of instructions matches an entire set of web site pages: all pages whose PATH field starts with "static-site/" and ends with a name followed by ".xml" extension (for example, www.sample.com/static-site/news-.xml). The first instruction loads the corresponding documents or other files from the xdocs directory (for example xdocs/news.xml). The second instruction applies an XSL transformation using one or more identified matching XML processors that transforms the original xml document into an HTML document adding web site user interface (web site navigation links, site logo etc). The last instruction returns the document to the browser in HTML format.

Accordingly, as illustrated and described above, the prior art provides methods for transforming and rendering documents. Unfortunately, these transformation rules currently can not be utilized in an effective and efficient manner by a document transformation server in a single application instance to transform multiple documents from multiple websites.

SUMMARY

A method for extending a document transformation server to process multiple documents from multiple websites includes obtaining with a document transformation server a document to process based on at least a URL of the document to process in an HTTP request URL. An XML source representing the document to process is generated with the document transformation server. One or more XML processors associated with at least a portion of the HTTP request URL from a plurality of stored associations are identified with the document transformation server. The XML source is transformed by the document transformation server with each of the identified one identified XML processors. The generated document is provided in an HTTP response to the HTTP request URL by the document transformation server.

A non-transitory computer readable medium having stored thereon instructions for extending a document transformation server to process multiple documents from multiple websites comprising machine executable code which when executed by at least one processor, causes the processor to perform steps including obtaining a document to process based on at least a URL of the document to process in an HTTP request URL. An XML source representing the obtained document to process is generated and one or more XML processors that are associated with at least a portion of the HTTP request URL from a plurality of stored associations are identified. The XML source is transformed with each of the identified one identified XML processors and the generated document is provided in an HTTP response to the HTTP request URL.

A document transformation apparatus includes one or more processors and a memory coupled to the one or more processors which are configured to execute programmed instructions stored in the memory obtaining a document to process based on at least a URL of the document to process in an HTTP request URL. An XML source representing the obtained document to process is generated and one or more XML processors that are associated with at least a portion of the HTTP request URL from a plurality of stored associations are identified. The XML source is transformed with each of the identified one identified XML processors and the generated document is provided in an HTTP response to the HTTP request URL.

This technology provides a number of advantages including providing a method, computer readable medium and an apparatus that extends a document transformation server to process multiple documents from multiple sites. With this technology, an exemplary document transformation server can efficiently manage the transformation and rendering of documents using a single web application instance.

BRIEF DESCRIPTION OF THE DRAWINGS

FIG. 3 is a prior art fragment of a configuration file;

FIG. 6 is an exemplary implementation of a mapping file.

DETAILED DESCRIPTION

Figure 1:
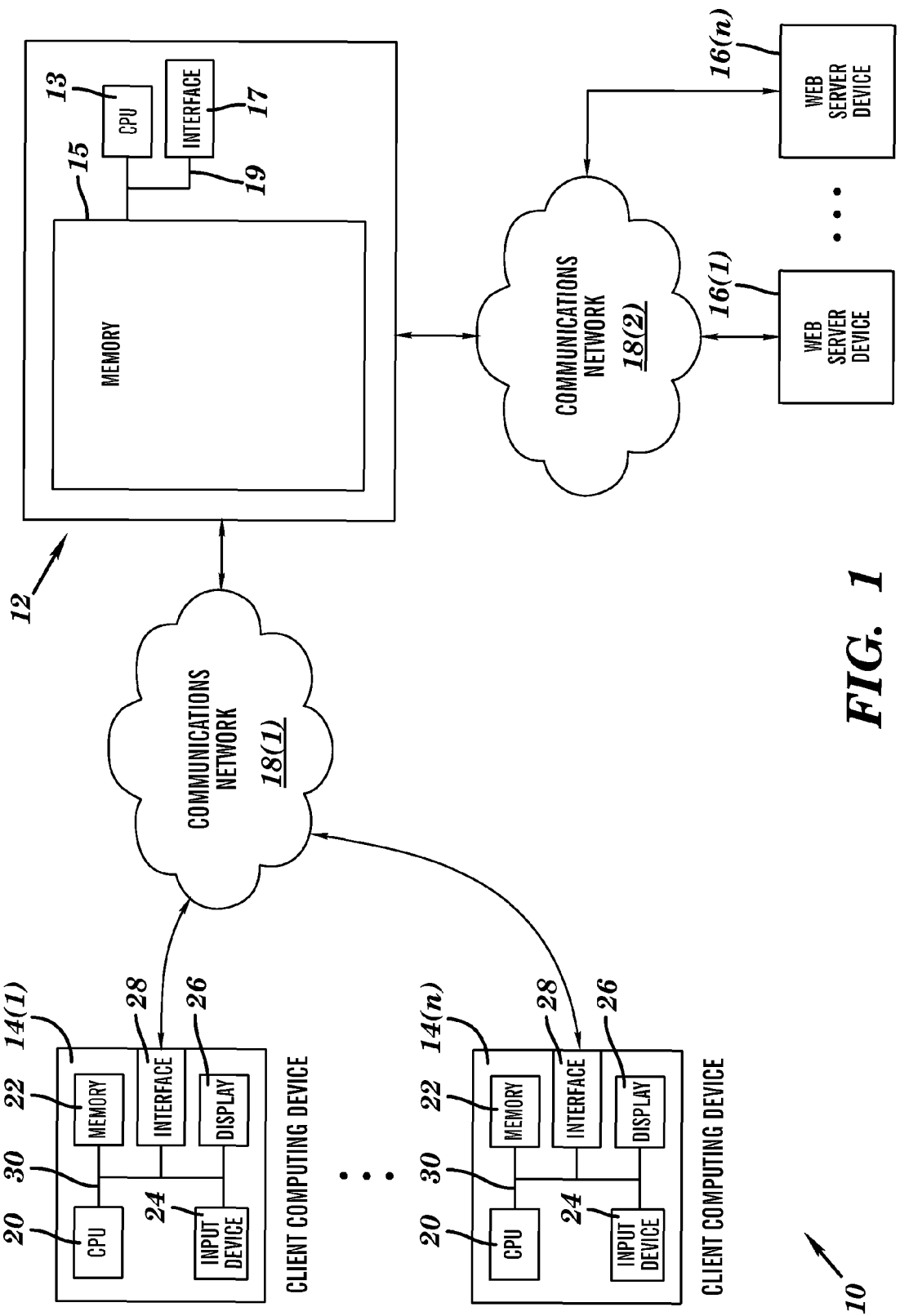
FIG. 1 is a block diagram of an exemplary environment with an exemplary document transformation server configured to process multiple documents from multiple sites.
Figure 2:
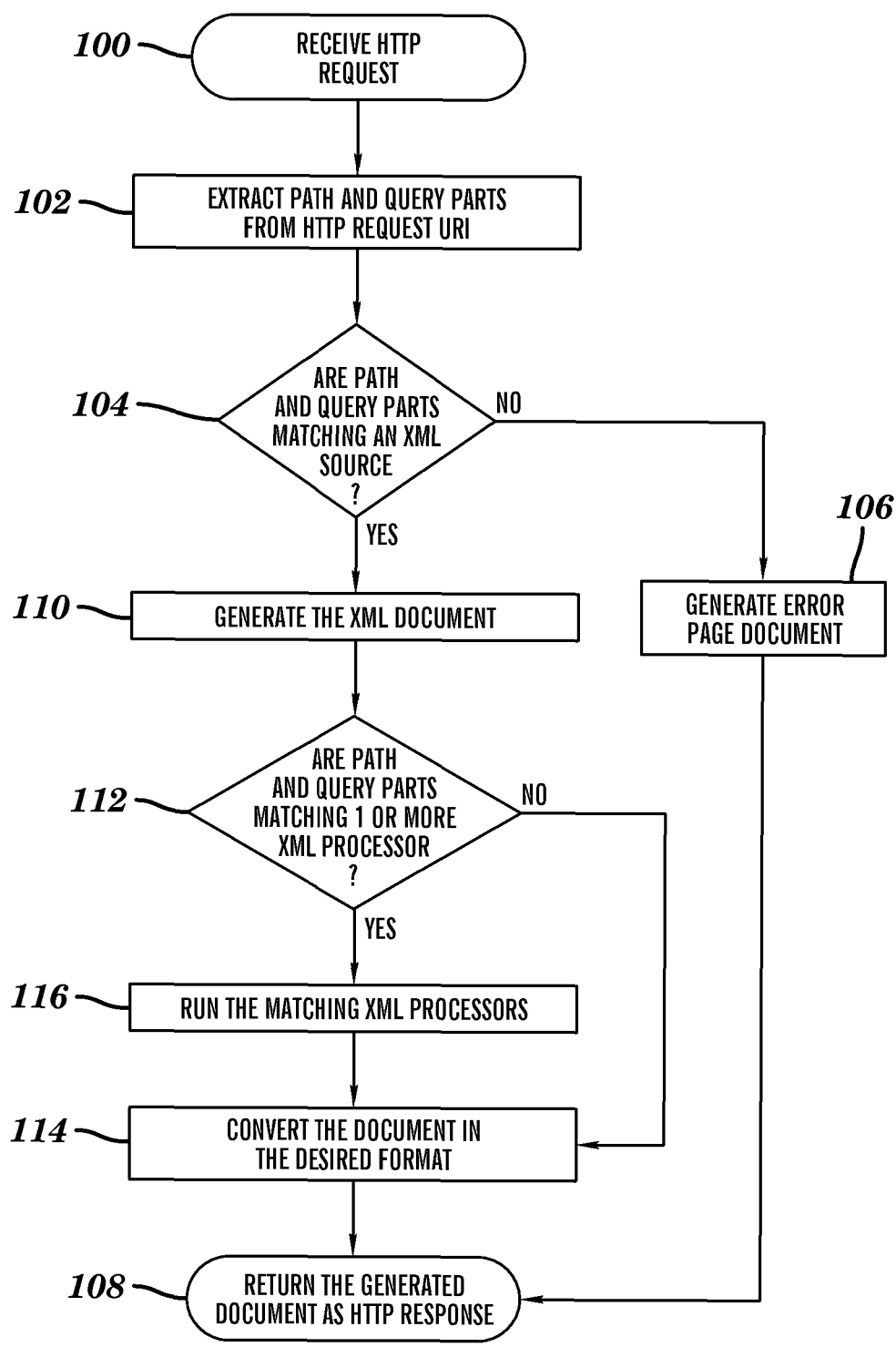
FIG. 2 is a flow chart of a prior art method for transforming and rendering a document.

An exemplary environment 10 with a document transformation server 12 configured to process multiple documents from multiple websites is illustrated in FIG. 1. The exemplary environment 10 includes the document transformation server or apparatus 12, client devices 14(1)-14(n), web server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that extends a document transformation server to process multiple documents from multiple sites.

Referring more specifically to FIG. 1, the document transformation server 12 includes a central processing unit (CPU) or processor 13, a memory 15, and an interface system 17 which are coupled together by a bus 19 or other link, although other numbers and types of components, parts, devices, systems, and elements in other configurations and locations can be used. Additionally, other types and numbers of proxy servers or other computing devices could be configured to execute the exemplary methods illustrated and described herein. The processor 13 in the document transformation server 12 executes a program of stored instructions one or more aspects of the present invention as described and illustrated by way of the embodiments herein, although the processor could execute other numbers and types of programmed instructions.

The memory 15 in the document transformation server 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the document transformation server 12.

The interface system 17 in the document transformation server 12 is used to operatively couple and communicate between the document transformation server 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, get and interact with documents and other files from one or more web sites hosted by the web server devices 16(1)-16(n) through the document transformation server 12 via one or more communication networks, although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n.

The user input device 24 in each of the client devices 14(1)-14(n) is used to input selections and other data, although the user input device could provide other functions and interact with other elements. The user input device can include keypads, touch screens, and/or vocal input processing systems although other types and numbers of user input devices can be used.

The display 26 in each of the client devices 14(1)-14(n) is used to show data and information to the user, such as a website page by way of example only. The display in each of the client devices 14(1)-14(n) is a computer screen display, although other types and numbers of displays could be used depending on the particular type of client device.

The interface system 28 in each of the client devices 14(1)-14(n) is used to operatively couple and communicate between the client devices 14(1)-14(n) and the document transformation server 12 and web server devices 16(1)-16(n) over the communication networks 18(1) and 18(2), although other types and numbers of communication networks with other types and numbers of connections and configurations can be used.

The web server devices 16(1)-16(n) provide one or more pages from one or more web sites for use by one or more of the client devices 14(1)-14(n) via the document transformation server 12, although the web server devices 16(1)-16(n) can provide other numbers and types of applications and/or content and can have provide other numbers and types of functions. Although web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations can be used. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16 (n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n) and the document transformation server 12 and the client devices 14(1)-14(n) via communication networks 18(1) and 18(2), although other types and numbers of communication networks with other types and numbers of connections and configurations can be used.

Although embodiments of the document transformation server 12, the client devices 14(1)-14(n), and the web server devices 16(1)-16(n), are described and illustrated herein, each of the client devices 14(1)-14(n), the document transformation server 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 4:
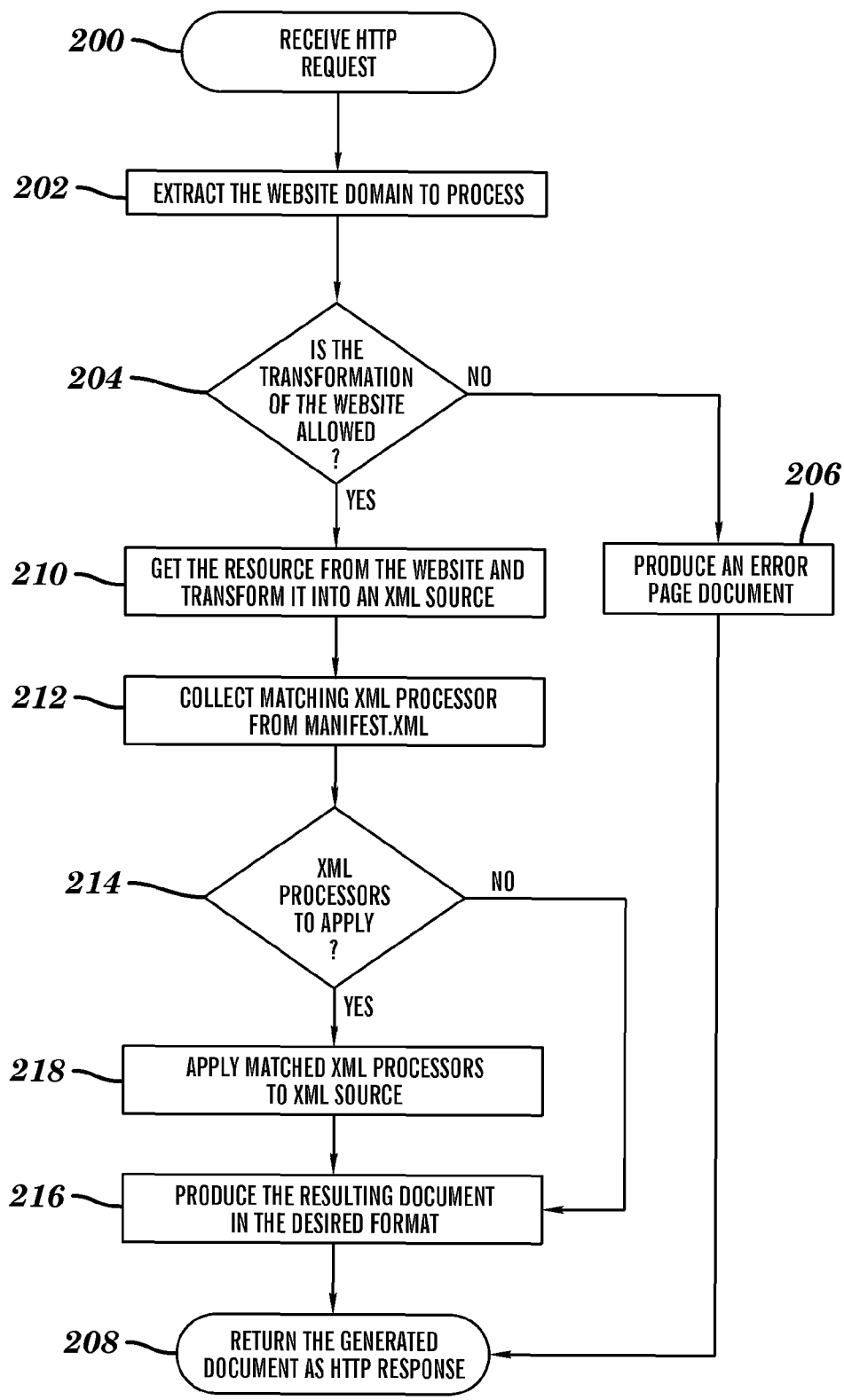
FIG. 4 is an exemplary flow chart of a method for extending a document transformation server to process multiple documents from multiple sites.

An exemplary method for extending a document transformation server 12 to process multiple documents from multiple sites, such as web server devices 16(1)-16(n), in an exemplary environment 10 will now be described with reference to FIGS. 1 and 4-6. Referring more specifically to FIG. 4, in step 200 the document transformation server 12 receives an HTTP request whose url contains the URI of the document to process, from one of the client computing devices 14(1)-14(n), although other types of requests could be received and from other types of devices. Optionally, if the URI of the document to process is encoded, the document transformation server 12 will decode the URI of the document to process, although other manners for processing an encoded URI or other encoded portion of a URI HTTP request could be used. Since manners for encoding and decoding are well known to those of ordinary skill in the art, they will not be described in detail here. By way of example only, consider an HTTP request from one of the client computing devices 14(1)-14(n) where the URL to be processed is embedded in the PATH field of the HTTP request url: http://processor.com/app/www.acme.com/anyproduct.html. The transformer server applications is identified by "processor.com/app"; the address www.acme.com/anyproduct.html is the resource to be processed.

In step 202, the document transformation server 12 extracts the domain in the URI of the document to process, although other fields of the URI could be extracted and used.

In step 204, the document transformation server 12 determines whether the transformation of the website in the URI of the document to process is allowed. If in step 204, the document transformation server 12 determines the transformation of the website in the URI of the document to process is not allowed, then the No branch is taken to step 206. In step 206, the document transformation server 12 generates an error page document. In step 208 the document transformation server 12 returns the generated error page document in an HTTP response to the one of the client computing devices 14(1)-14(n) that provided the HTTP request in this example.

If in step 204, the document transformation server 12 determines the transformation of the website in the URI of the document to process is allowed, then the Yes branch is taken to step 210. In step 210, the document transformation server 12 downloads the original document or other resource linked by the given URL and transforms the downloaded document into an XML source, although other manners for processing the obtained document or documents can be used. In step 212, document transformation server 12 looks for a mapping or configuration file for the directory that matches the extracted domain. An exemplary method for locating a mapping file from manifest.xml is described herein with reference to FIG. 5.

In step 214, the document transformation server 12 determines whether the mapping file for the extracted domain exists. If in step 214 the document transformation server 12 determines the mapping file does not exist, then the No branch is taken to step 216. In step 216, the document transformation server 12 converts the document into the desired format. Next, in step 208 the document transformation server 12 returns the converted document in an HTTP response to the one of the client computing devices 14(1)-14(n) that provided the HTTP request.

If in step 214 the document transformation server 12 determines the mapping file for the extracted domain does exist, then the Yes branch is taken to step 218. In step 218, the document transformation server 12 use the mapping file to identify all of the XSL processors linked to the corresponding URL and applies the identified XSL processors to the document to be processed. Optionally the document transformation server 12 may apply one or more best matching rules to filter the identified one or more XML processors in the matching directory. By way of example only, one best matching rule is to take the XML processor with the longest matching pattern string, although other types and numbers of best matching rules can be used.

In step 216, the document transformation server 12 converts the processed document into the desired format. Next, in step 208 the document transformation server returns the converted document in an HTTP response to the one of the client computing devices 14(1)-14(n) that provided the HTTP request.

Figure 5:
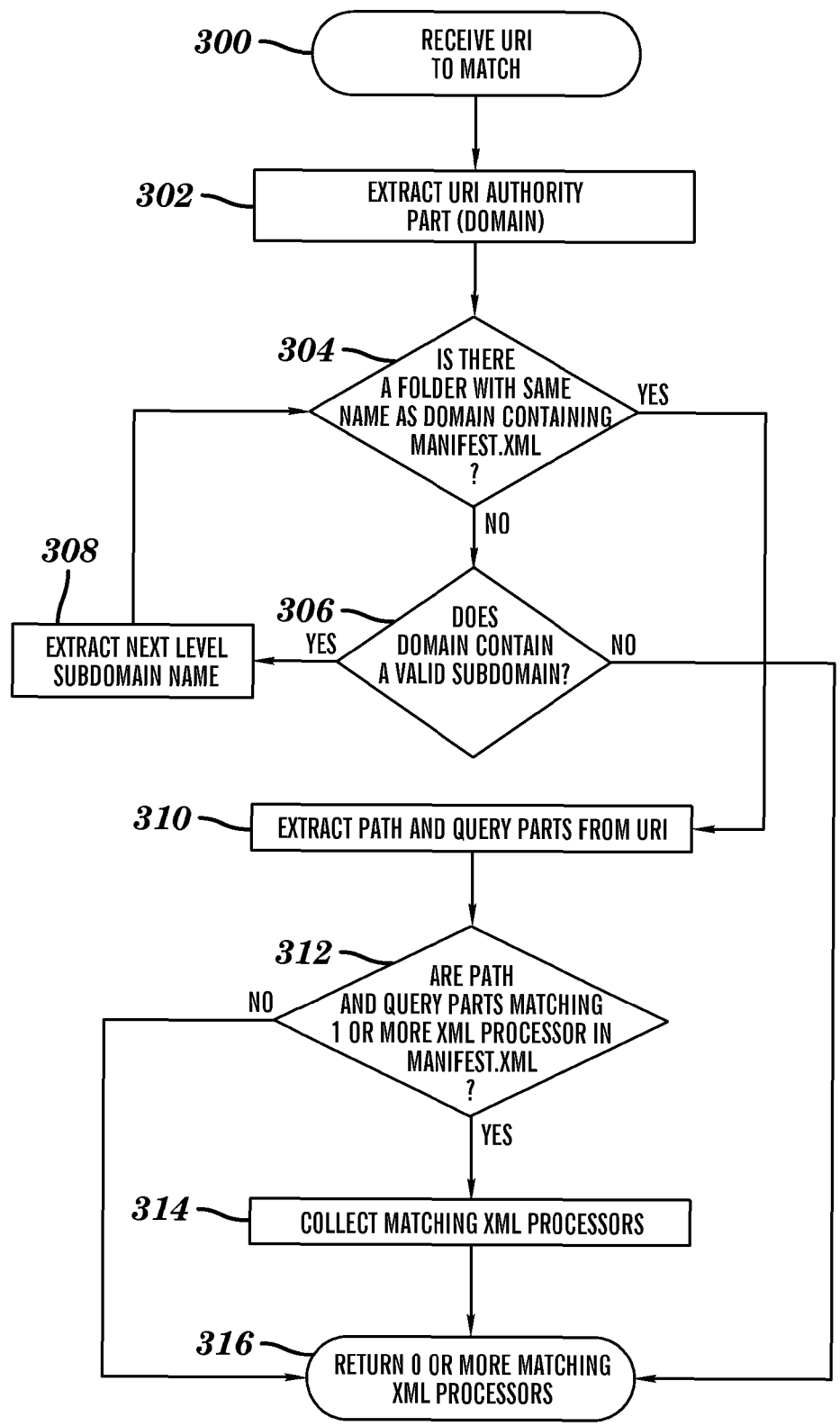
FIG. 5 is an exemplary flow chart of a method for obtaining a mapping file.

Referring to FIG. 5, an exemplary method for obtaining a mapping file with the document transformation server 12 is illustrated. In step 300, the document transformation server 12 receives a URI to match from one of the client computing devices 14(1)-14(n), although other types of requests could be received and from other types of devices. In step 302, the document transformation server 12 extracts from the URI the AUTHORITY portion corresponding to the associated domain and port, for example "ssl.example.com:8443", although other types and numbers of fields could be extracted.

In this example, if the port is either 80 or 443 (default values for HTTP and HTTPS respectively) the string representing the authority corresponds to the domain portion of the URL. However, if the port does not correspond to a standard value, the ':' character is substituted with '_' in order to avoid potential problems in the file system (i.e. ssl.example.com_8443). The string representing the authority is further stripped by the document transformation server 12 removing the 'www.' from the extracted string.

In step 304, the document transformation server 12 determines whether there is a directory with the same name as the extracted domain and containing the mapping file, although other manners for determining matches with other portions of the domain can be used. By way of example only, consider the following directories: (1) "www.acme.com"; (2) "_.example.com"; and (3) "ssl.example.com". The www.acme.com directory will match all the requests for www.acme.com and acme.com domains. With this technology, the "_.example.com" directory will match all the requests for domains ending with ".example.com" that do not have more specific matching directories. Accordingly, "_.example.com" will match "products.example.com", but it will not match "ssl.example.com" because an "ssl.example.com" directory exists. The "_" character in front of ".example.com" is used to make the directory visible when using file systems that use "." characters in front of files to hide them to users.

If in step 304 the document transformation server 12 determines there is no directory with the same name as the extracted domain, then the No branch is taken to step 306. In step 306, the document transformation server 12 determines whether the domain contains a valid subdomain. If in step 306 the document transformation server 12 determines the domain does contain a valid subdomain, then the Yes branch is taken to step 308. In step 308, the document transformation server 12 extracts the next level subdomain name and returns to step 304 as described earlier.

If in step 304 the document transformation server 12 determines there is a directory with the same name as the extracted domain and containing the mapping file, then the Yes branch is taken to step 310, although other manners for determining matches with other portions of the domain can be used. In another example, the document transformation server 12 may also use another optional mapping file that stores known aliases of domains. When a known alias of a domain is identified using this optional mapping file, the document transformation server 12 can use the same one or more stored directories for the known and identified aliases. As a result, this reduces the number of stored directories when handling domains with multiple aliases (i.e. defined with DNS records of type CNAME).

In step 310, the document transformation server 12 extracts the parts from the PATH and QUERY fields in the URI, although the parts can be extracted from other types and numbers of fields in the URI.

In step 312, the document transformation server 12 determines whether the extracted parts in the PATH and QUERY fields of the URI match or otherwise have an association with one of one or more XML processors in the identified mapping file, although other types of associations between other types and numbers of parts can be used. If in step 312 the document transformation server 12 determines the extracted parts in the PATH and QUERY fields of the URI match or otherwise have an association with one of one or more XML processors, then the Yes branch is taken to step 314 where the matching XML processors are collected. Next, in step 316, the document transformation server 12 returns the collected XML processors to the requesting one of the client computing devices 14(1)-14(n).

If in step 312 the document transformation server 12 determines the extracted parts in the PATH and QUERY fields of the URI do not match one of one or more XML processors, then the No branch is taken to step 316 where no matching XML processors are returned to the requesting one of the client computing devices 14(1)-14(n).

Referring to FIG. 6, an exemplary implementation of the mapping file "manifest.xml" is illustrated. Each map element identifies an XSL file (inside file element) and a substring to match a URL PATH component (inside the PATH element). The map element with the longest string matching the PATH component will be used to setup the XSL transformer identified by the level attribute.

In these examples, two XSL transformers are defined: level 1 transformer; and level 2 transformer. If the request URL has the PATH field containing "/content/news/july.html", then the original site web page is downloaded (for example, www.sample.com/content/news/july.html). Next, the level 1 transformer uses the news.xsl stylesheet document to transform the downloaded page. The level 2 transformer uses content2.xsl stylesheet document to transform the document obtained from the level 1 transformer.

If the request URL has the PATH field containing "/content/privacy.html", then the original site web page is downloaded (for example www.sample.com/content/privacy.html). Next, the level 1 transformer uses the content.xsl stylesheet document to transform the downloaded page. Next, the level 2 transformer uses the content2.xsl stylesheet document to transform the document obtained from the level 1 transformer.

Accordingly, as illustrated and described herein this technology provides a number of advantages including providing a method, computer readable medium and an apparatus that extends a document transformation server to process multiple documents from multiple sites. One of the advantages of this technology is that a single association or match between a name of a directory and at least a portion of a domain name or other part of a URI can be used for hundreds or thousands of URIs. As a result, only a few associations with directories or other stored tables can be enough for the document transformation server to transform the content of an entire website.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for utilizing web application instances to efficiently transform multiple web documents from multiple websites to have customized display formats, the method comprising:
    obtaining by a document transformation server a web document to process based on at least a Uniform Resource Locator (URL) of the web document in a received HyperText Transfer Protocol (HTTP) request from one of client computing devices, the web document in a first display format;
    identifying by the document transformation server a data structure having an identifier matching a first portion of the URL and retrieving a plurality of associations from the data structure, the plurality of associations comprising a mapping of a plurality of processors to one or more parts of one or more fields in the URL, wherein the first portion of the URL comprises one or more of a domain, a path, or one or more parameters of the URL;
    selecting by the document transformation server one of the processors associated with a longest string matching the first portion of the URL or a second portion of the URL, wherein the string associated with the one of the processors comprises more characters matching the first or second portion of the URL than another string associated with each other of the processors;
    transforming by the document transformation server the web document with the selected one of the processors into a second display format, at least one of the first or second display formats capable of being rendered by a web browser; and
    providing by the document transformation server the transformed web document in an HTTP response to the one of the client computing devices.

2. The method as set forth in claim 1 wherein the web document is further obtained based on one or more of an HTTP header or an HTTP POST parameter in the HTTP request.

3. The method as set forth in claim 1 wherein the obtaining further comprises decoding the obtained URL of the web document prior to obtaining the web document.

4. The method as set forth in claim 1 further comprising:
    generating by the document transformation server an XML source representing the web document;
    transforming by the document transformation server the XML source with the selected one of the one or more processors; and
    providing by the document transformation server the transformed XML source in the HTTP response.

5. A non-transitory computer readable medium having stored thereon instructions for extending a document transformation server to utilize web application instances to efficiently transform multiple web documents from multiple websites to have customized display formats comprising machine executable code which when executed by a processor, causes the processor to:
    obtain a web document to process based on at least a Uniform Resource Locator (URL) of the web document in a received HyperText Transfer Protocol (HTTP) request from one of client computing devices, the web document in a first display format;
    identify a data structure having an identifier matching a first portion of the URL and retrieve a plurality of associations from the data structure, the plurality of associations comprising a mapping of a plurality of processors to one or more parts of one or more fields in the URL, wherein the first portion of the URL comprises one or more of a domain, a path, or one or more parameters of the URL;

select one of the processors associated with a longest string matching the first portion of the URL or a second portion of the URL, wherein the string associated with the one of the processors comprises more characters matching the first or second portion of the URL than another string associated with each other of the processors;

transform the web document with the selected one of the processors into a second display format, at least one of the first or second display formats capable of being rendered by a web browser; and provide the transformed web document in an HTTP response to the one of the client computing devices.

6. The medium as set forth in claim 5 wherein the web document is further obtained based on one or more of an HTTP header or an HTTP POST parameter in the HTTP request.

7. The medium as set forth in claim 5 wherein the machine executable code, when executed by the processor, further causes the processor to decode the obtained URL of the web document prior to obtaining the web document.

8. The medium as set forth in claim 5 wherein the machine executable code when executed by the processor, further causes the processor to:

generate an XML source representing the web document;

transform the XML source with the selected one of the processors; and provide the transformed XML source in the HTTP response.

9. A document transformation apparatus comprising:

a memory comprising programmed instructions stored in the memory; and a processor coupled to the memory and configured to execute the programmed instructions stored in the memory to:

obtain a web document to process based on at least a Uniform Resource Locator (URL) of the web document in a received HyperText Transfer Protocol (HTTP) request from one of client computing devices, the web document in a first display format;

identify a data structure having an identifier matching a first portion of the URL and retrieve a plurality of associations from the data structure, the plurality of associations comprising a mapping of a plurality of processors to one or more parts of one or more fields in the URL, wherein the first portion of the URL comprises one or more of a domain, a path, or one or more parameters of the URL;

select one of the processors associated with a longest string matching the first portion of the URL or a second portion of the URL, wherein the string associated with the one of the processors comprises more characters matching the first or second portion of the URL than another string associated with each other of the processors;

transform the web document with the selected one of the processors into a second display format, at least one of the first or second display formats capable of being rendered by a web browser; and provide the transformed web document in an HTTP response to the one of the client computing devices.

10. The apparatus as set forth in claim 9 wherein the web document is further obtained based on one or more of an HTTP header or an HTTP POST parameter in the HTTP request.

11. The apparatus as set forth in claim 9 wherein the processor is further configured to execute the programmed instructions stored in the memory to decode the obtained URL of the web document prior to obtaining the web document.

12. The apparatus as set forth in claim 9 wherein the processor coupled to the memory is further configured to execute the programmed instructions stored in the memory to:

generate an XML source representing the web document;

transform the XML source with the selected one of the processors; and provide the transformed XML source in the HTTP response.

* * * * *